United States Patent [19]

Santoro

[11] 4,184,182
[45] Jan. 15, 1980

[54] CONTROL MECHANISM FOR THE MOVEMENTS OF A TAPE CASSETTE IN A TAPE CASSETTE RECORDER

[75] Inventor: Giovanni Santoro, Rome, Italy

[73] Assignee: Werbetronic A.G., Mauren, Liechtenstein

[21] Appl. No.: 909,021

[22] Filed: May 24, 1978

[30] Foreign Application Priority Data

May 26, 1977 [IT] Italy .............................. 49577 A/77

[51] Int. Cl.² ...................... G11B 15/24; G11B 15/18
[52] U.S. Cl. .................................... 360/96.6; 242/198
[58] Field of Search ................... 360/96, 92, 130, 83, 360/93, 96.1, 96.5, 96.6; 242/199–200

[56] References Cited

U.S. PATENT DOCUMENTS

| 3,394,898 | 7/1968 | Laa | 360/96 |
| 3,867,722 | 2/1975 | Syohji | 360/96 |
| 3,902,193 | 8/1975 | Hapke | 360/96 |
| 3,936,011 | 2/1976 | Staar | 242/198 |
| 3,947,884 | 3/1976 | Yokota et al. | 360/96 |
| 3,957,225 | 5/1976 | Vogel | 360/96 |
| 4,014,041 | 3/1977 | Cicatelli | 360/96 |
| 4,065,800 | 12/1977 | Wilson et al. | 360/96 |

Primary Examiner—Alfred H. Eddleman
Attorney, Agent, or Firm—DeLio and Montgomery

[57] ABSTRACT

A control mechanism for a cassette tape recorder including an articulated control lever provided with members for engaging the cassette and with members for raising and lowering the cassette into and out of the playback position.

10 Claims, 6 Drawing Figures

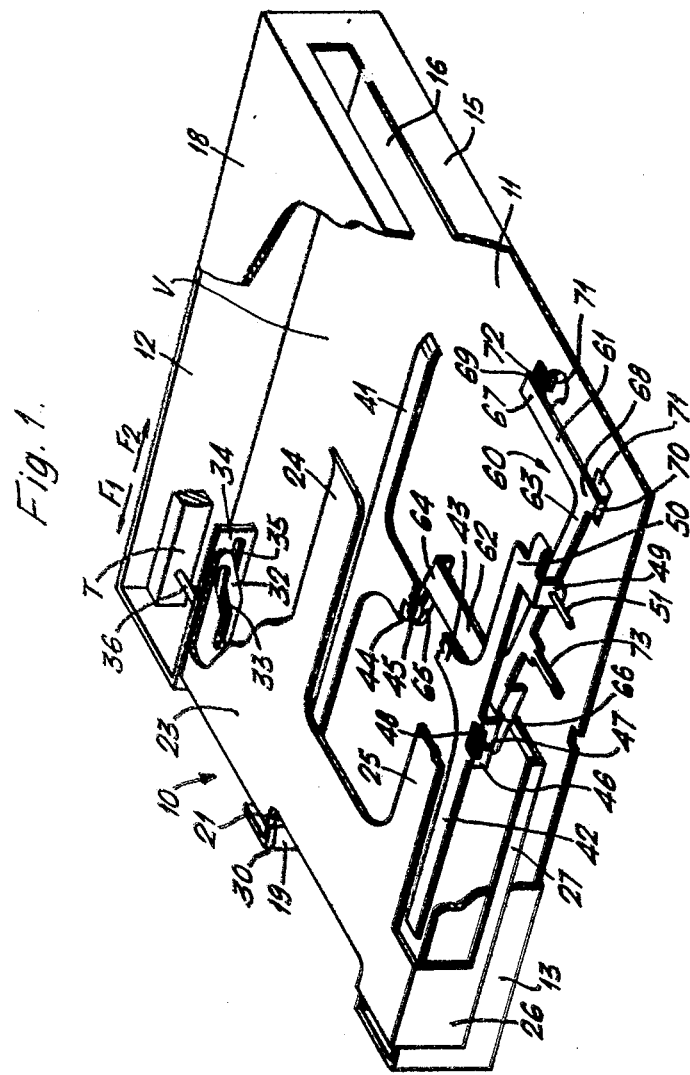

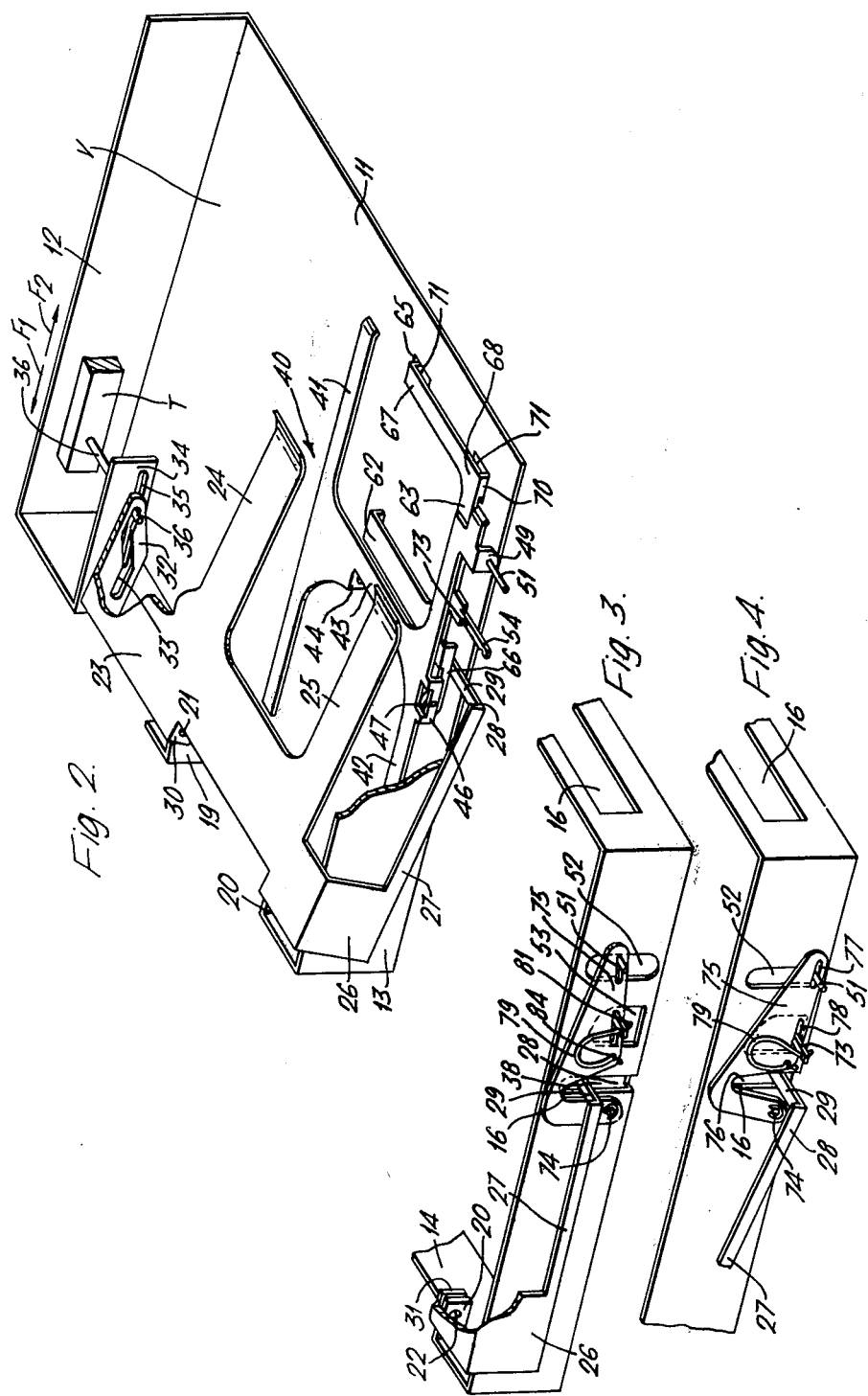

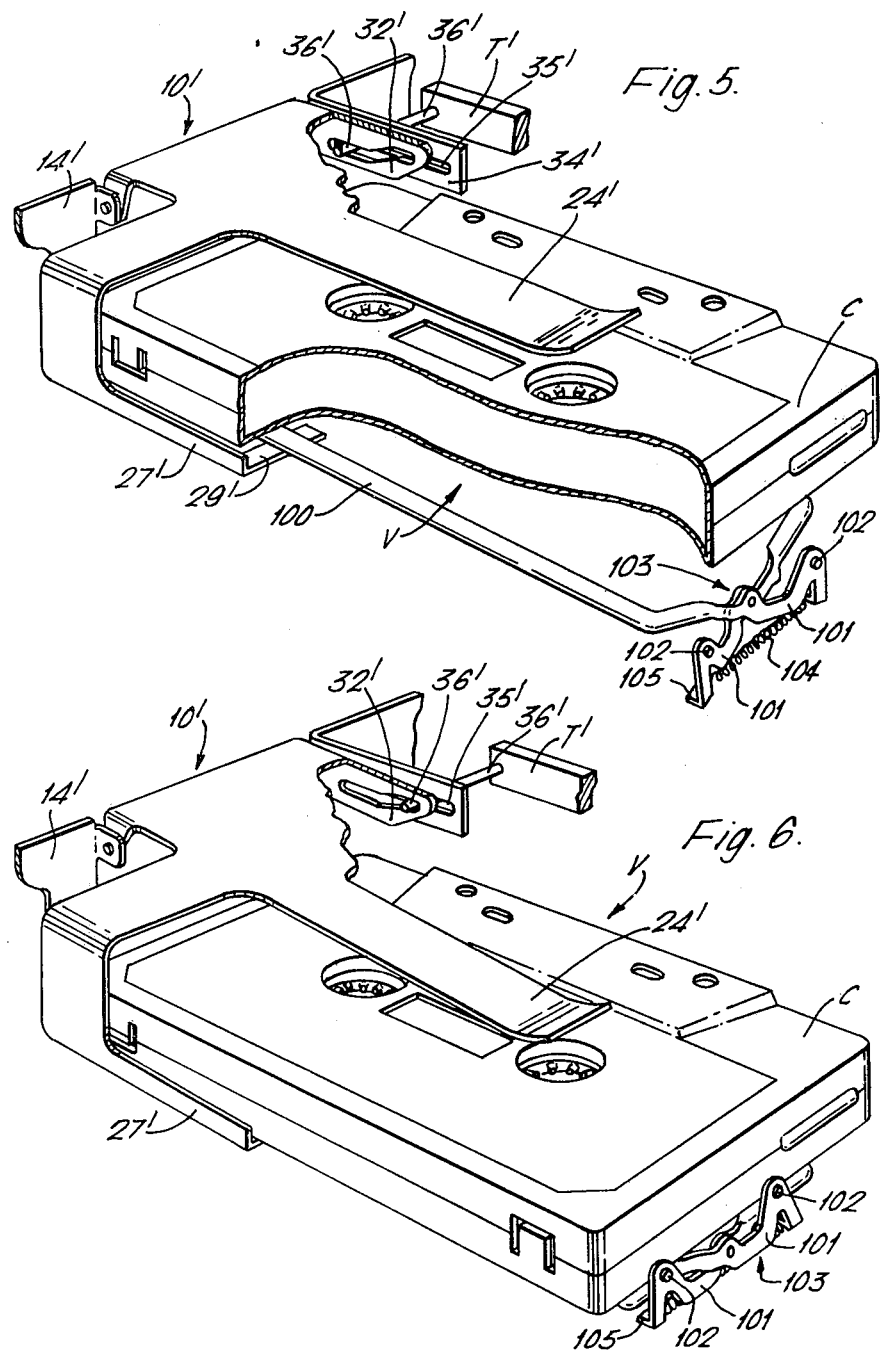

CONTROL MECHANISM FOR THE MOVEMENTS OF A TAPE CASSETTE IN A TAPE CASSETTE RECORDER

This invention concerns a control mechanism for moving the cassette between the expulsion and introduction position and the play-back position thereof, adapted to cooperate with a tape recorder, comprising:

a rectangular housing to receive the cassette, wherein the cassette can be displaced between the above mentioned introduction and expulsion position and the duty position, consisting of a bottom wall, two side walls—one of which showing a slit and two side-by-side windows—, a back wall and a front wall, having at its upper part an elongated, rectangular slit, through which the cassette can be introduced and expulsed and suitable members for driving the cassette tape, when in the play-back position mounted on the bottom wall as well as an operating member for actuating the tape recorder.

In such tape recorders it is necessary that the control mechanism for moving the cassette for the introduction and expulsion of the same is as simple as possible, and not of an expensive manufacturing. Furthermore a control mechanism is desired which consists of as few details as possible and which can be realized blanking and punching convenient metal sheets. Finally, it is necessary that the control mechanism guarantees a quick back movement of the cassette from the play-back position into the expulsion position.

Up to now no one of the known control mechanisms for moving the cassette in tape recorders satisfies these requirements. These control mechanisms are encoumbering, which means a waste of place, and furthermore they are unreliable; moreover, their manufacturing is complicated because of the great number of different details and consequently very expensive. Finally, in the known control mechanisms for cassette tape recorders, raising the cassette from the play-back position to the expulsion position is usually performed by spring members, which do not operate satisfactorily.

Therefore it is an object of this invention to provide a control mechanism of the kind set forth, of simple and cheap construction, utilizing a number of parts as reduced as possible—preferably three—which is realized blanking and punching convenient metal sheets, and allows a quick and reliable back movement from the play-back to the expulsion position.

Accordingly an improved control mechanism is provided which receives and moves the cassette introduced therein from the introduction position into the lowered play-back position, and vice-versa, this control mechanism consisting of:

a control lever articulated in the housing, provided with members for engaging the cassette and members for the connection to the actuating member. Accordingly, a control mechanism is provided substantially comprising three parts only, all of them obtained by simple blanking and punching operations on a suitable light metal sheet, these parts being appropriately mounted on the walls defining the housing of the tape recorder, in which the cassette is moved between the introduction and expulsion position and the play-back position, and being reciprocally articulated and/or connected.

Therefore the main feature of the invention is that this mechanism comprises three main parts only, of which the most important is a control lever member.

The present invention will be now described more particularly here below, referring to the attached drawings, wherein:

FIG. 1, is a perspective view of a first embodiment of the control mechanism according to the present invention, in the raised position for the introduction and expulsion of the tape-cassette with respect to the tape recorder;

FIG. 2, is a similar view of the mechanism of FIG. 1, in the lowered, duty position of the tape-cassette;

FIG. 3, is a detail showing, in a perspective view, the mechanism of FIG. 1 in the raised position, some parts being removed for sake of clearness;

FIG. 4, is a similar view showing the mechanism in the lowered position of FIG. 2;

FIG. 5, is a perspective view, with cut-away and/or omitted parts, of a second embodiment of the mechanism according to the present invention, in the lowered position; and FIG. 6, is a perspective view, similar to the one of FIG. 5, the mechanism being in its lowered position.

Referring particularly to FIGS. 1 to 4, in its first embodiment, the mechanism according to this invention consists essentially of a control lever 10, an oscillating support means 40 and an articulating frame 60.

The mechanism is received in housing V, which in the tape recorders is usually intended to receive the tape-cassette and, as the case may be, to receive the movement between the introduction and expulsion position and the duty position of the tape-cassette, the housing being defined by bottom wall 11; by two side walls 12 and 13; by back wall 14; by front wall 15 provided with rectangular opening 16 for the tape cassette; and by top wall 18.

Two tabs 19 and 20 are formed in the upper part of back wall 14, perpendicular thereto, and extending into housing V, each tab being in turn provided with a horizontally placed pin, the two pins being in alignment and facing towards each other, these pins being shown at 21 (FIG. 2) and at 22 (FIG. 3).

In housing V control lever 10 is received, having a flat upper part 23, from which two arms 24 and 25 extend, being perpendicular to part 23 and parallel to each other. From part 23 also a projection 26 extends laterally, being crank-bent, and passing above side wall 13 of housing V, and extending parallel thereto with a thin arm 27, said arm being also parallel to arms 24 and 25. Arm 27 is crank-bent as to form an operating rod 29, which will be at a lower level than arms 24 and 25, passing through elongated opening 28 in side wall 13 (FIGS. 3 and 4).

Upper flat part 23 has, furthermore, two tabs 30 and 31, corresponding to tabs 19 and 20 of back wall 14, respectively, provided with holes to receive pins 21 and 22 for a pivot movement on wall 14, and a side tab 32, provided with a much flattened "S"-shaped slit 33, for controlling the movements of the mechanism, as will be described here below.

The oscillating means 40 has the shape of an "H" and has two parallel arms 41 and 42, connected by crosspiece 43.

Bent tab 44 is formed on crosspiece 43, tab 44 being provided with horizontal pin 45, while another bent tab 46 is formed on the outer edge of arm 42 and is provided with pin 47, aligned with pin 45. Tab 46 forms furthermore opening 48.

Arm 42 has a tab 49 bent downwards also at its end 50, and a pin 51 extends outwardly therefrom, passing outwards of housing V through window 52 in wall 13.

Articulating frame 60 has substantially a "C"-shape, showing two arms 61 and 62 parallel to each other and arm 63 connecting one end thereof.

Upper arm 62 shows two tabs 65 and 66 formed externally of the part connecting arm 62 with arm 63 and at the ends 64, these tabs being provided with holes adapted to receive pins 45 and 47 of tabs 44 and 46, belonging to "H"-shaped element 40. Lower arm 61 shows at each end 67 and 68 a tab bent downwards, shown at 69 and 70, extending through slits 71 in bottom wall 11 of housing V. In tabs 69 and 70 (conveniently perforated) pins 72 are fitted, which are mounted on outer face of bottom wall 11 (of which pins only one is visible in FIG. 1), so that element 60 is pivoted at the base, in order to be able to twist about pins 72.

Arm 73 is integral with arm 63 of frame 60, and extends outwardly through window 53 on side wall 13.

Furthermore, externally to side wall 13, and more precisely on pin 74, integral thereto (FIGS. 3 and 4), lever 75 is pivotally mounted showing a deep notch 76 corresponding to window 28, and slits 77 and 78 corresponding to windows 52 and 53, respectively.

Finally, a horse-shoe-shaped wire spring 79 (FIGS. 3 and 4) is secured with its ends 80 and 81 in hole 84 of the wall and on the end of arm 73, respectively.

When lever 75 is pivotally mounted on pin 74 so as to twist, parallel to side wall 13, the slits 77 and 78 will correspond exactly to windows 52 and 53, and slits 77 and 78 will receive the end of pin 51 and of arm 73, respectively.

It will be noted that being the parts described above assembled as illustrated in the drawings, the end of rod 29 of arm 27, integral with control lever 10, is below tab 66 of frame 60.

It will be also noted that a third tab 34, parallel to and much longer than tabs 19 and 20 of lever 10, is formed in back wall 14 of housing V, third tab 34 being very close to tab 32 and having a straight slit 35.

A pin 36 integral with control member T of the cassette tape recorder, is received in corresponding slits 33 and 35, control member T having opposite operating strokes, in the direction of arrows $F_1$ and $F_2$.

It is useful to note that control member T, is part of this invention only because control member T controls the position and movements of control lever 10 axially moving, owing to pin 36 and slits 35 and 33.

In operation, the complete introduction of the tape cassette (not shown), between arms 24 and 25 and oscillating member 40 through 16 will cause control member T to snap in the direction of arrow $F_2$, owing to mechanisms not included in this invention, and therefore control lever 10, owing to combined action of pin 36 and slits 35 and 33, will lower downwardly, by means of arms 24 and 25. Therefore the cassette will move onto bottom wall 11, to be engaged with the required driving mechanism (not shown), in which position the described parts will take the position according to FIG. 2.

In order to obtain the expulsion of the tape cassette from the tape recorder, control member T will be conveniently operated (by means of said mechanisms not included in this invention), to cause control member T to snap in the direction of arrow $F_1$, thus causing control lever 10 to raise.

The raising movement of lever 10 will be transmitted to frame 60 by arm 29 engaged below tab 66, and therefore to member 40, that will take the tape cassette again in the raised position, in which the same will expulsed by appropriate members (not shown).

It is useful to note the double function of control lever 10 in this invention, i.e. to push the tape cassette from the introduction position to the duty position, and to take the same back from the duty position to the expulsion position. This feature allows the spring means normally used in such tape recorders to be omitted, such spring means being unreliable.

It will be noted that the downwards movement of the assembly consisting of control lever 10, member 40 and frame 60, is guided and controlled by the assembly consisting of lever 75 and wire spring 79, which allows oscillating member 40 to move up and down mantaining parallel a same plane.

The embodiments of the invention shown in FIGS. 5 and 6 is based on the same principle, i.e. to entrust to control lever 10' both the functions of lowering tape cassette C into the duty position and to raise the same into the expulsion position, but in this embodiment different means for supporting the cassette are utilized. These means consist of an articulated frame comprising two elements 100 shaped as a very wide "U", having elongated arms 101 of the illustrated configuration. Arms 101 are pivotally mounted on front and back walls 15' and 14' by means of pins 102, and they are articulated to each other by means of a slit and pin joint 103, the two elements 100 being restricted to move together by spring 104, hooked at bent ends 105 of arms 101.

The movement of the described frame is obvious, and therefore it will be not further described. It will be sufficient to note that also in this case the raising of the tape cassette is controlled by lever 10' by means of rod 29' of arm 27', engaged below element 100 on the right.

Owing to the different construction of this frame, in this embodiment it is possible to make use of only one control arm 24', instead of the two arms 24 and 25 of the first embodiment, illustrated referring to FIGS. 1 to 4.

It is obvious from what set forth that the intended arms are completely reached by the mechanism improved according to the present invention.

It is understood that the mechanism, as described and illustrated, can be modified and changed in the structural details, without departing from the scope and the concepts of the invention.

I claim:

1. A control mechanism for a cassette tape recorder, including:
   (a) a rectangular housing (V; V') receiving the cassette (C), in which the cassette can be moved from a raised introduction and expulsion position to a lowered play-back position, said housing (V; V') being defined by a bottom wall (11); two side walls (12,13), one of which is provided with a slit and two side-by-side windows; a back wall (14); and a front wall (15) having an introduction and expulsion rectangular opening (16) in the upper part thereof, through which the cassette is introduced into and expulsed out of said housing;
   (b) driving means for the cassette mounted in said bottom wall; and
   (c) a reciprocating actuating member for actuating the tape recorder, housed in said housing, this control mechanism comprising:

control lever means articulated in said housing and provided with means engaging the introduced cassette and connecting means for the connection to said actuating member; such as said control lever means pivotally snap between said raised position and lowered position according to the reciprocating movement of said actuating member in one and the other direction; and supporting means for the cassette articulated in the housing and adapted to receive the cassette and bearing the same below said engaging means, wherein said control lever means are also provided with rising means of said supporting means engaging the latter at least during the pivotal rising snapping movement of said control lever means as to snap raise also said supporting means.

2. A control mechanism according to claim 1, wherein said control lever means (10; 10') comprise a blanked metal sheet, articulated on said back wall (14; 14'), having: a flat upper part (23; 23'), provided with two articulated tabs (19,20); furthermore an actuating longer tab (32; 32') provided with a much flattened, elongated "S"-shaped slit (33; 33'); at least one operating arm (24,25; 24') adapted to engage and push the cassette (C) during said downwards pivotal snapping, and raising member (26,27,29; 26',27',29') integral with said flat part (23,23') adapted to engage said supporting means (40,60,; 100) during said raising snap movement so as to raise said supporting means and consequently said cassette (C).

3. A control mechanism according to claims 1 or 2, wherein said support means (40,60; 100) of the cassette (C) comprise an "H"-shaped oscillating member (40)—adapted to receive cassette (C)—and a "C"-shaped articulating frame (60), articulated upwardly to oscillating member (40) and downwardly to bottom wall (11; 11'), so as to allow said oscillating member and articulated frame to rise and lower, which oscillating member (40) is provided with an engaging part adapted to be engaged by said rising member of said control lever means (10; 10'), during said upwardly pivotal snapping movement of the latter.

4. A control mechanism according to claim 1, wherein said side wall (13) shows two side-by-side windows (28,53), an outwardly pin (74) and a hooking hole (84); said oscillating member (40) is provided with pin (51) extending outwardly of side wall (13) through one of said windows (52), and said articulating frame (60) is provided with an arm (73), showing a hooking hole (53) at the outer end thereof, extending through window (53) outwardly of said side wall (13), and wherein a lever (75), provided with two slits (77,78), is pivoted on pin (74), each one of slits (77,78) corresponding to one of said windows (52,53) of said side wall (13), wherein said slit (77) receives the end of said pin (51) of oscillating member (40), and slit (78) receives the end of arm (73) of articulating frame (60), while a horse-shoe-shaped wire spring (79) is hooked with one end on said lever (75) at said hole (84), and an arm (73) of articulating frame (60) with the other end.

5. A control mechanism according to claims 1 or 2, wherein said support means (100) for cassette (C) comprise two wide "U"-shaped members, connected by a spring and having the corresponding crossing each other and articulated on two opposite walls of said housing (V; V') at the ends thereof and are reciprocally articulated in a central position wherein one of said members (100) has an engaging part to be engaged by said rising member of said control lever means (10; 10'), during the upward pivotal snapping of the latter.

6. A control mechanism according to claims 1 or 2, wherein said back wall (14'; 14) has a long tab (34'; 34) provided with elongated, straight slit (35'; 35), placed sideways of said tab (32'; 32) of control lever (10'; 10), provided with said "S"-shaped slit (33'; 33) wherein said actuating member (T':T) has a pin (36'; 36) fixed thereto, fitted both in said "S"-shaped slit (33'; 33) and in straight slit (35'; 35), so that the reciprocating snapping movements thereof in both the direction of arrow $F_1$ and arrow $F_2$ cause said control lever means (10,10') to pivotally snap upwards and downwards.

7. In a cassette tape recorder including a housing for receiving a cassette and driving means mounted on said housing,
a control mechanism for moving a cassette between an upper introduction and expulsion position and a lower play position, comprising:
a first support member having a first end pivotally connected to said housing and a second free end;
a second support member adapted to supportively engage a cassette and being pivotally supportively mounted to said second free end of said first support member; and
a control lever pivotally mounted to said housing, said control lever having a first arm extending above said second support member and adapted to contact the top of a cassette to downwardly force the cassette from said upper position to said lower position, and a second arm extending below said first support member and adapted to upwardly force the cassette from said lower position to said upper position.

8. The device of claim 7 wherein said second arm engages said first support member so that the upward pivotal movement of said control lever causes said second arm to raise said first and second support members to upwardly force a cassette from said lower position to said upper position.

9. The device of claim 8 wherein said tape recorder further includes actuable means for driving a pin between first and second positions, and
said control lever comprises:
an elongated tab having an S-shaped slit therein with said driving pin slidably mounted within said slit so that movement of said driving pin to said first position pivots said control lever downwardly with said first arm adapted to contact the top of a cassette to force the cassette downwardly to said lower position, and movement of said driving pin to said second position pivots said control lever upwardly to raise said second arm.

10. The device of claim 7 wherein:
said second support member is H-shaped adapted to oscillate about the pivotal connection to said first support member, and
said first support member is C-shaped with an engagement portion adapted to be engated by said second arm so that the upward movement of said second arm pivots said first support member upwardly to raise said second support member.

* * * * *